US011307849B2

(12) United States Patent
Zhou et al.

(10) Patent No.: US 11,307,849 B2
(45) Date of Patent: Apr. 19, 2022

(54) METHOD FOR CREATING HYPERLEDGER FABRIC NETWORK, CONTROLLER AND STORAGE MEDIUM

(71) Applicant: Beijing Baidu Netcom Science and Technology Co., Ltd., Beijing (CN)

(72) Inventors: Hang Zhou, Beijing (CN); Yuxiao Song, Beijing (CN); Hongbin Mao, Beijing (CN); Siyuan Pan, Beijing (CN); Haodong Chen, Beijing (CN); Hui Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 78 days.

(21) Appl. No.: 16/691,353

(22) Filed: Nov. 21, 2019

(65) Prior Publication Data

US 2020/0310789 A1    Oct. 1, 2020

(30) Foreign Application Priority Data

Mar. 29, 2019    (CN) .......................... 201910251318.X (51) Int. Cl.
*G06F 8/71*    (2018.01)
*G06F 16/27*    (2019.01)
*G06F 8/60*    (2018.01)

(52) U.S. Cl.
CPC ................ *G06F 8/71* (2013.01); *G06F 8/60* (2013.01); *G06F 16/27* (2019.01)

(58) Field of Classification Search
CPC ............... G06F 16/27; G06F 8/60; G06F 8/71
See application file for complete search history.

(56) References Cited

U.S. PATENT DOCUMENTS

2019/0102409 A1*  4/2019  Shi .................... H04L 67/2823
2020/0092363 A1*  3/2020  Viswanathan ........ G06F 9/4401
2020/0177373 A1*  6/2020  Komandur ............ H04L 9/0816

OTHER PUBLICATIONS

Delan, "Deploying Hyperledger Fabric on Kubernetes", Apr. 11, 2018, pp. 1-11 (Year: 2018).*
Hyperledger, "How to deploy Hyperledger Fabric on Kubernetes Part II", Nov. 15, 2018, pp. 1-17 (Year: 2018).*
"A Developers Guide to Automated Hyperledger Fabric Deployment," https://debutinfotech.medium.com/a-developers-guide-to-automated-hyperledger-fabric-deployment-763118e53669; Debut Infotech; Feb. 22, 2019.
Hisunah, "Blockchain network on kubernetes," https://github.com/IBM/blockchain-network-on-kubernetes/blob/master/README.md; GitHub, Inc., pp. 1-9, Jul. 3, 2018.

(Continued)

*Primary Examiner* — Duy Khuong T Nguyen
(74) *Attorney, Agent, or Firm* — Kilpatrick Townsend & Stockton LLP (57) ABSTRACT

Embodiments of the present disclosure relates to the field of block chain technology, and provides a method for creating a Hyperledger Fabric network, a controller and a storage medium. The method may include: acquiring a configuration file required to create a Hyperledger Fabric network in a Kubernetes cluster; and creating the Hyperledger Fabric network in the Kubernetes cluster according to the configuration file and a preset state machine. Embodiments of the present disclosure are applicable to the procedure of creating the Hyperledger Fabric network.

15 Claims, 2 Drawing Sheets

(56) References Cited

OTHER PUBLICATIONS

Yewale, Aniket Jalinder,"Study of Blockchain-as-a-Service Systems with a Case Study of Hyperledger Fabric Implementation on Kubernetes",DIGITAL SCHOLARSHIP@UNLV, 2018, pp. 58-74,(URL:https://digitalscholarship.unlv.edu/thesesdissertations/3392/).
FinTech HDInsight, Nikkei Cloud First, Nikkei Business Publications, Inc. Dec. 20, 2018, vol. 33, pp. 26-31.
Hyperledger Fabric, vol. 1, Jun. 22, 2018, pp. 296-300; http://www.ric.co.jp/book/seigo_list.html.
Kubernetes, Software Design, Mar. 18, 2018, vol. 395, pp. 64-72.
Yewale, Aniket Jalinder, "Study of Blockchain-as-a-Service Systems with a Case Study of Hyperledger Fabric Implementation on Kubernetes" (Aug. 1, 2018), UNLV Theses, Dissertations, Professional Papers, and Capstones, 3392, pp. 1-78, http://dx.doi.org/10.34917/14139923.

* cited by examiner

METHOD FOR CREATING HYPERLEDGER FABRIC NETWORK, CONTROLLER AND STORAGE MEDIUM

CROSS-REFERENCE TO RELATED APPLICATIONS

This application claims priority to Chinese Patent Application No. 201910251318.X, filed with the China National Intellectual Property Administration (CNIPA) on Mar. 29, 2019, the content of which is incorporated herein by reference in its entirety.

TECHNICAL FIELD

The present disclosure relates to the field of blockchain technology, and specifically to a method for creating a Hyperledger Fabric network, a controller and a storage medium.

BACKGROUND

A Hyperledger Fabric (hereinafter referred to as Fabric) network is a modular distributed ledger solution support platform. In the existing technologies, there are two approaches to create a Fabric network. One approach is to use an automated deployment tool (e.g., Ansible), to sequentially deploy Fabric network components into an environment by deploying scripts. This approach is relatively primitive, which is a process of scripting the most primitive approach of manually deploying the network components one by one, which realizes the automatic creation of the Fabric network. The other approach is to use a developed backend service to create the Fabric network. For example, if the Fabric network needs to be deployed into a Kubernetes cluster, it is necessary to develop a backend service interacting with the Kubernetes, and create the Fabric network in the Kubernetes cluster by calling a relevant interface of the backend service.

For the first creation approach in the existing technologies, a user needs to additionally learn script writing, which is not convenient for the user. The second creation approach has high development costs and occupies many resources since the backend service for the deployment needs to be separately developed.

SUMMARY

The purpose of the present disclosure is to provide a method for creating a Hyperledger Fabric network, a controller and a storage medium, in order to solve the problem in the existing technologies. The problem refers to that, during the creation of the Fabric network, a user needs to additionally learn the script writing, the creation approach is not convenient, and a backend service for deployment needs to be separately developed, resulting in high development costs. A Hyperledger Fabric network is created in a Kubernetes cluster through a configuration file and a preset state machine, and thus realizing the automation of deploying the Fabric network into the Kubernetes cluster, thereby saving hardware resources and manpower investments.

In order to achieve the above purpose, some embodiments in a first aspect of the present disclosure provide a method for creating a Hyperledger Fabric network. The method includes: acquiring a configuration file required to create a Hyperledger Fabric network in a Kubernetes cluster; and creating the Hyperledger Fabric network in the Kubernetes cluster according to the configuration file and a preset state machine.

Further, the configuration file includes component information. The creating the Hyperledger Fabric network in the Kubernetes cluster according to the configuration file and a preset state machine includes: creating the Hyperledger Fabric network in the Kubernetes cluster according to a creation order of components in the preset state machine and the component information.

Further, the creating the Hyperledger Fabric network in the Kubernetes cluster according to a creation order of components in the preset state machine and the component information includes: acquiring meta information from the component information, and initializing the meta information; creating a component relevant file according to the initialized meta information; creating a MySQL component according to MySQL component information in the component information, after the component relevant file is successfully created; creating a CA component according to CA component information in the component information, after the MySQL component is successfully created; creating a certificate file according to the component information, after the CA component is successfully created; creating an Orderer component according to Orderer component information in the component information, after the certificate file is successfully created; creating a Peer component according to Peer component information in the component information, after the Orderer component is successfully created; and determining the Hyperledger Fabric network being successfully created in the Kubernetes cluster and the Hyperledger Fabric network being in a running state, after the Peer component is successfully created.

Further, after the creating the Hyperledger Fabric network in the Kubernetes cluster, the method further includes: monitoring running states of components in the Hyperledger Fabric network; and recreating, when a component stopping running being presented in the Hyperledger Fabric network is detected, the component stopping running, according to component information corresponding to the component stopping running in the component information.

Further, the method further includes: recreating, when an upgraded configuration file is acquired, the Hyperledger Fabric network in the Kubernetes cluster according to the upgraded configuration file and the preset state machine.

Some embodiments in a second aspect of the present disclosure provide a controller. The controller includes: an acquiring unit, configured to acquire a configuration file required to create a Hyperledger Fabric network in a Kubernetes cluster; and a creating unit, configured to create the Hyperledger Fabric network in the Kubernetes cluster according to the configuration file and a preset state machine.

Further, the creating unit is further configured to create the Hyperledger Fabric network in the Kubernetes cluster according to a creation order of components in the preset state machine and the component information.

Further, the creating unit is further configured to acquire meta information from the component information, and initialize the meta information; create a component relevant file according to the initialized meta information; create a MySQL component according to MySQL component information in the component information, after the component relevant file is successfully created; create a CA component according to CA component information in the component information, after the MySQL component is successfully created; create a certificate file according to the component information, after the CA component is successfully created; create an Orderer component according to Orderer component information in the component information, after the certificate file is successfully created; create a Peer component according to Peer component information in the component information, after the Orderer component is successfully created; and determine the Hyperledger Fabric network being successfully created in the Kubernetes cluster and the Hyperledger Fabric network being in a running state, after the Peer component is successfully created.

Further, the controller further includes: a monitoring unit, configured to monitor running states of components in the Hyperledger Fabric network. The creating unit is further configured to recreate, when a component stopping running being presented in the Hyperledger Fabric network is detected, the component stopping running, according to component information corresponding to the component stopping running in the component information.

Further, the acquiring unit is further configured to acquire an upgraded configuration file; and the creating unit is further configured to recreate the Hyperledger Fabric network in the Kubernetes cluster according to the upgraded configuration file and the preset state machine.

Some embodiments in a third aspect of the present disclosure provide a storage medium, storing an instruction. The instruction, when executed on a computer, causes the computer to perform the above method for creating a Hyperledger Fabric network.

Through the above technical solution, the configuration file required to create the Hyperledger Fabric network in the Kubernetes cluster is acquired, and the Hyperledger Fabric network is created in the Kubernetes cluster according to the configuration file and the preset state machine. The embodiments of the present disclosure solves the problem in the existing technologies. The problem refers to that, during the creation of the Fabric network, the user needs to additionally learn the script writing, the creation approach is not convenient, and the backend service for the deployment needs to be separately developed, resulting in the high development costs. Thus, the embodiments of the present disclosure realizes the automation of deploying the Fabric network into the Kubernetes cluster, thereby saving the hardware resources and the manpower investments.

BRIEF DESCRIPTION OF THE DRAWINGS

Accompanying drawings are used for providing a further understanding for the present disclosure, constitute a part of the specification, and for explaining the present disclosure together with the following specific embodiments. The drawings do not constitute the limitation to scope of the present disclosure. In the accompanying drawings.

DETAILED DESCRIPTION OF EMBODIMENTS

The specific implementations of the present disclosure are described in detail below with reference to the accompanying drawings. It should be understood that the specific implementations described herein are merely used for describing and explaining the present disclosure, rather than limiting the present disclosure.

In a Kubernetes cluster, a plurality of containers are created such that one application instance runs in each container, thus configuring and managing a complex and stateful application instance. However, in the existing technology, during deploying a Hyperledger Fabric network in the Kubernetes cluster, it is necessary to develop a backend service interacting with the Kubernetes cluster, resulting in a high development cost. In some embodiments of the present disclosure, the Hyperledger Fabric network is automatically created in the Kubernetes cluster by using a customized Fabric Operator. The specific creation process will be described in detail below.

Figure 1:
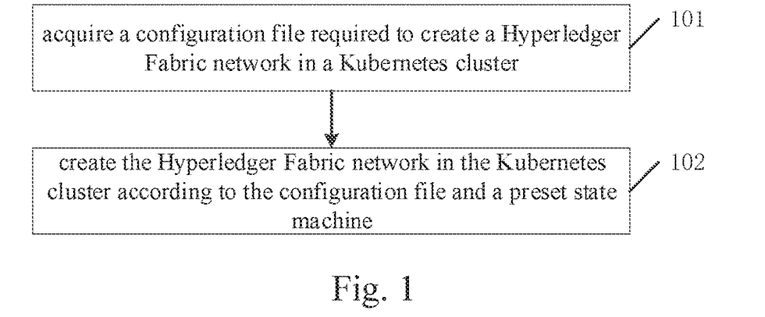
FIG. 1 is a schematic flowchart of a method for creating a Hyperledger Fabric network provided by an embodiment of the present disclosure.

FIG. 1 is a schematic flowchart of a method for creating a Hyperledger Fabric network provided by an embodiment of the present disclosure. As shown in FIG. 1, the method is applied to a Fabric Operator, which is a controller deployed in the Kubernetes cluster to monitor and manage a Hyperledger Fabric network. The method includes the following steps:

Step 101, acquiring a configuration file required to create a Hyperledger Fabric network in a Kubernetes cluster, and Step 102, creating the Hyperledger Fabric network in the Kubernetes cluster according to the configuration file and a preset state machine.

The Kubernetes cluster applied in the embodiments of the present disclosure refers to version of Kubernetes 1.7 and above, which supports CRDs (custom resource definitions), and thus, the resource type of the Kubernetes cluster may be customized. The configuration file is a custom resource type containing all component information required to create the Hyperledger Fabric network. The component information includes: CA component information, for signing a certificate required by a network; MySQL component information, for storing the certificate signed by a CA component; Orderer component information, for sorting a transaction; and Peer component information, for performing implementation of the transaction and bookkeeping.

Figure 2:
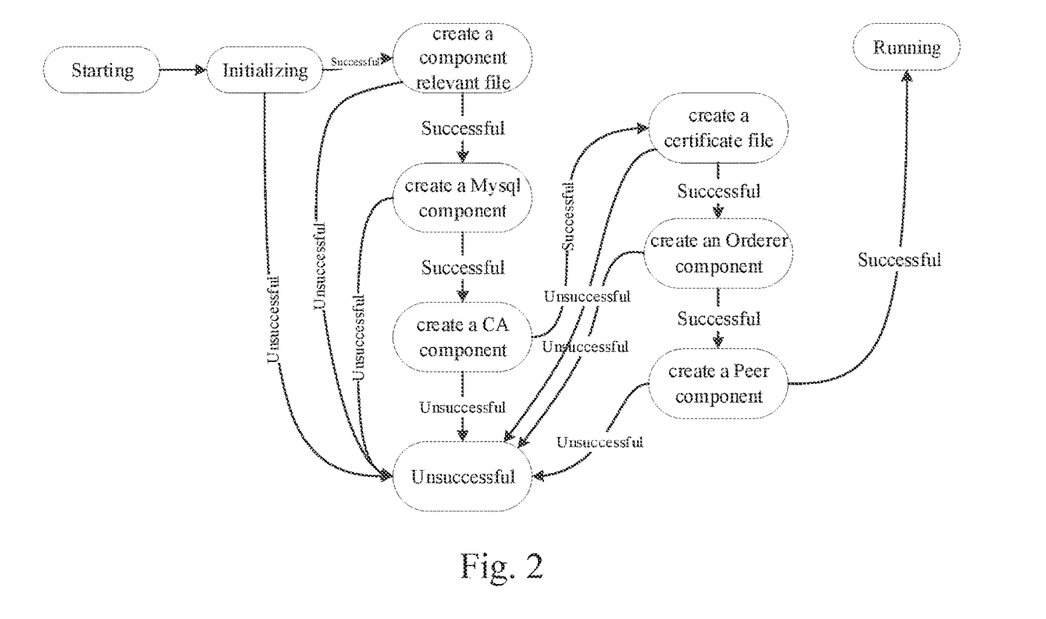
FIG. 2 is a schematic diagram of a preset state machine provided by an embodiment of the present disclosure.

Here, the Hyperledger Fabric network is created in the Kubernetes cluster according to the creation order of a component in the preset state machine and the component information. As shown in FIG. 2, first, meta information is acquired from the component information, the meta information is initialized, and a component relevant file is created according to the initialized meta information. After the component relevant file is successfully created, a MySQL component is created according to the MySQL component information in the component information. After the MySQL component is successfully created, the CA component is created according to the CA component information in the component information. After the CA component is successfully created, a certificate file is created according to the component information. After the certificate file is successfully created, an Orderer component is created according to the Orderer component information in the component information. After the Orderer component is successfully created, a Peer component is created according to the Peer component information in the component information. After the Peer component is successfully created, it is determined that the Hyperledger Fabric network is successfully created in the Kubernetes cluster, and the Hyperledger Fabric network is in a running state. Here, during the creation of each of the components, if the creation is unsuccessful, the process of creating the Hyperledger Fabric network is directly exited, and the prompt indicating that the creation is unsuccessful is given, for the user to view the reason why the creation is unsuccessful.

In addition, during the creation of each of the above components, the following needs to be performed circularly: monitoring current states of the components, and then analyzing the difference between the current states and the expected states in the component information, to make a current state of a corresponding component reach the expected state by performing an operation corresponding to the component.

Here, the Fabric Operator, as a controller whose service is deployed in the Kubernetes cluster, may directly interact with the Master of the Kubernetes cluster, and may manage using the kubectl command in the Kubernetes cluster, and may manage using the object type in the Kubernetes cluster, and at the same time, the Fabric Operator is displayed on the dashboard in the Kubernetes cluster. In addition, the Fabric Operator may further obey the rule and restriction of an API in the Kubernetes cluster, reuse the common function of a Kubernetes API, and call the API to deploy the corresponding Kubernetes resources, e.g., CRUD, watch, a built-in authentication and an authorization. Therefore, since the Fabric Operator itself is in the Kubernetes cluster, and may freely call the resources in the Kubernetes cluster, it does not need to separately develop the backend service for the deployment of the Hyperledger Fabric network like the existing technology, which saves hardware resources, and also saves costs of the interactions between the cluster and the backend service in a different network environment.

In an implementation of the present disclosure, after the Hyperledger Fabric network is created in the Kubernetes cluster, the operation and maintenance may further be automatically performed by monitoring the running states of the components in the Hyperledger Fabric network. Specifically, the running states of the components in the Hyperledger Fabric network are monitored. When it is detected that a component stopping running is presented in the Hyperledger Fabric network, the component stopping running is recreated according to the component information corresponding to the component stopping running in the component information, and thus it is not required to make a manual intervention for the component problem to perform maintenance, which saves manpower costs.

In addition, in another implementation of the present disclosure, during upgrading the Hyperledger Fabric network, the Hyperledger Fabric network progress may be reconfigured by changing the configuration file. When an upgraded configuration file is acquired, the Hyperledger Fabric network may be recreated in the Kubernetes cluster according to the upgraded configuration file and the preset state machine. Here, the upgrade procedure is identical to the creation procedure, that is, according to the preset state machine and the component information in the upgraded configuration file, the Hyperledger Fabric network is created according to the creation order of the components. Here, the current states of the components are also monitored, and then the difference between the current states and the expected states in the component information is analyzed. By performing an operation corresponding to the component, the current state of the corresponding component reaches the expected state, and then the Hyperledger Fabric network in the running state is obtained.

Through embodiments of the present disclosure, the Hyperledger Fabric network may be automatically deployed in the Kubernetes cluster, the stability of the Hyperledger Fabric network in the Kubernetes cluster is maintained through the Fabric Operator, to ensure that the Hyperledger Fabric network is always in the expected state. The embodiments of the present disclosure saves the related software and hardware resources dedicated to the deployment of the backend service which are required in the existing technology, and the running of the Hyperledger Fabric network is in the Kubernetes cluster, which also saves the costs of the interaction between the cluster and the backend service in the original cluster and even in the different network environment. In addition, the Fabric Operator automatically performs the creation of the Hyperledger Fabric network, thereby freeing unnecessary manpower investments in the creation of the Hyperledger Fabric network.

Figure 3:
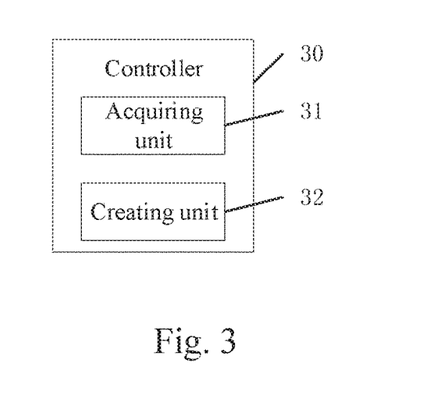
FIG. 3 is a schematic structural diagram of a controller provided by an embodiment of the present disclosure.

Correspondingly, FIG. 3 is a schematic structural diagram of a controller provided by an embodiment of the present disclosure. As shown in FIG. 3, the controller refers to the Fabric Operator mentioned in the foregoing embodiment, and the controller 30 includes: an acquiring unit 31, configured to acquire a configuration file required to create a Hyperledger Fabric network in a Kubernetes cluster; and a creating unit 32, configured to create the Hyperledger Fabric network in the Kubernetes cluster according to the configuration file and a preset state machine.

Here, the creating unit is further configured to create the Hyperledger Fabric network in the Kubernetes cluster according to a creation order of the components in the preset state machine and the component information.

In addition, the creating unit is further configured to: acquire meta information from the component information, and initialize the meta information; create a component relevant file according to the initialized meta information; create a MySQL component according to MySQL component information in the component information, after the component relevant file is successfully created; create a CA component according to CA component information in the component information, after the MySQL component is successfully created; create a certificate file according to the component information, after the CA component is successfully created; create an Orderer component according to Orderer component information in the component information, after the certificate file is successfully created; create a Peer component according to Peer component information in the component information, after the Orderer component is successfully created; and determine the Hyperledger Fabric network being successfully created in the Kubernetes cluster and the Hyperledger Fabric network being in a running state, after the Peer component is successfully created.

Figure 4:
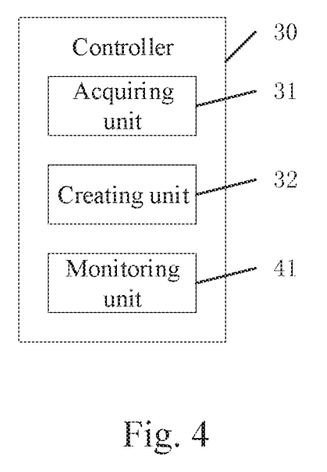
FIG. 4 is a schematic structural diagram of another controller provided by an embodiment of the present disclosure.

As shown in FIG. 4, the controller 30 further includes: a monitoring unit 41, configured to monitor the running states of the components in the Hyperledger Fabric network. The creating unit is further configured to recreate, when a component stopping running being presented in the Hyperledger Fabric network being detected, the component stopping running, according to component information corresponding to the component stopping running in the component information.

Further, the acquiring unit is further configured to acquire an upgraded configuration file. The creating unit is further configured to recreate the Hyperledger Fabric network in the Kubernetes cluster according to the upgraded configuration file and the preset state machine.

The controller provided by the embodiment of the present disclosure creates the Hyperledger Fabric network in the Kubernetes cluster through the configuration file and the preset state machine, and thus realizing the automation of deploying the Fabric network into the Kubernetes cluster, thereby saving hardware resources and manpower investments.

Correspondingly, some embodiments of the present disclosure further provides a storage medium. The storage medium stores an instruction. The instruction, when executed on a computer, causes the computer to perform the method for creating a Hyperledger Fabric network described in the foregoing embodiments.

It should be appreciated by those skilled in the art that embodiments of the present disclosure may be provided as a method, system, or computer program product. Thus, the present disclosure may take the form of an entirely hardware embodiment, an entirely software embodiment, or an embodiment combining hardware and software. Moreover, some embodiments of the present disclosure may take the form of a computer program product implemented on one or more computer usable storage media (including, but not limited to, a disk storage device, a CD-ROM, an optical storage device, etc.) which includes a computer usable program code.

Embodiments of the present disclosure is described with reference to the flowcharts and/or block diagrams of the method, the device (system), and the computer program product according to the embodiments of the present disclosure. It should be understood that each flow and/or block in the flowcharts and/or block diagrams and a combination of the flows and/or blocks in the flowcharts and/or block diagrams may be implemented by computer program instructions. These computer program instructions may be provided to a processor of a general purpose computer, a special-purpose computer, an embedded processor, or other programmable data processing devices to produce a machine, such that the instructions executed by the processor of the computer or other programmable data processing devices produce an apparatus for implementing the functions specified in one or more flows in the flowcharts and/or one or more blocks in the block diagrams.

These computer program instructions may be alternatively stored in a computer readable storage device that can guide the computer or the other programmable data processing devices to operate in a particular way, such that the instructions stored in the computer readable storage device produce a product including an instruction apparatus, the instruction apparatus implements the functions specified in the one or more flows in the flowcharts and/or the one or more blocks in the block diagrams.

These computer program instructions may be alternatively loaded onto a computer or other programmable data processing devices, such that a series of operation steps are performed on the computer or other programmable devices to produce computer-implemented processing, such that the instructions executed on the computer or other programmable devices provide steps for implementing the functions specified in the one or more flows in the flowcharts and/or the one or more blocks in the block diagrams.

In a typical configuration, a computing device includes one or more processors (CPUs), input/output interfaces, network interfaces, and memories.

A storage device may include a non-persistent memory, a random access memory (RAM), and/or a non-volatile memory in a computer readable medium, for example, a read only memory (ROM) or a flash RAM. A memory is an example of a computer readable medium.

Computer readable media include both persistent and non-persistent media, and both removable and non-removable media, and information storage may be implemented by any method or technology. The information may be computer readable instructions, data structures, modules of programs, or other data. For example, computer storage media include, but not limited to, a phase change memory (PRAM), a static random access memory (SRAM), a dynamic random access memory (DRAM), other types of random access memories (RAMs), a read only memory (ROM), an electrically erasable programmable read only memory (EEPROM), a flash memory or other memory technologies, a compact disk read only memory (CD-ROM), a digital versatile disk (DVD) or other optical storages, a magnetic cassette tape, magnetic tape and magnetic disk storages, or other magnetic storage devices or any other non-transmission medium, and may be used to store information that may be accessed by the computing device. As defined herein, the computer readable medium does not include transitory medium, for example, modulated data signals and carrier waves.

It should also be noted that the terms "comprise," "include" or any other variations are intended to encompass a non-exclusive inclusion, such that a process, method, commodity or device including a series of elements not only include those elements, but also includes other elements that are not explicitly listed or elements that are inherent to such a process, method, commodity or device. An element defined by the phrase "comprising a . . . " does not exclude the presence of additional identical elements in the process, method, commodity or device that comprising the element, without more limitations.

It should be appreciated by those skilled in the art that embodiments of the present disclosure may be provided as the method, system, or computer program product. Thus, some embodiments of the present disclosure may take the form of the entirely hardware embodiment, the entirely software embodiment, or the embodiment combining hardware and software. Moreover, some embodiments of the present disclosure may take the form of the computer program product implemented on one or more computer usable storage media (including, but not limited to, the disk storage device, the CD-ROM, the optical storage device, etc.) which includes a computer usable program code.

The above only refers to the embodiments of the present disclosure, and is not intended to limit the scope of present disclosure. For those skilled in the art, various changes and variations may be made to some embodiments of the present disclosure. Any modifications, equivalents and replacements, improvements, etc. made within the spirit and principle of the present disclosure should be included within the scope of the claims of the present disclosure.

What is claimed is:

1. A method for automatically creating a Hyperledger Fabric network in a Kubernetes cluster, applied to a fabric operator, the fabric operator being a controller deployed in the Kubernetes cluster to monitor and manage the Hyperledger Fabric network, the method comprising:
  acquiring, by the fabric operator, a configuration file required to create the Hyperledger Fabric network in the Kubernetes cluster, wherein the configuration file comprising information of components; and
  creating, by the fabric operator, the Hyperledger Fabric network in the Kubernetes cluster according to the configuration file and a preset state machine, the preset state machine comprising a preset creation order of the components,
  wherein creating the Hyperledger Fabric network in the Kubernetes cluster comprises:

creating by the fabric operator the Hyperledger Fabric network in the Kubernetes cluster according to the information of the components and the preset creation order of the components in the preset state machine.

2. The method according to claim 1, wherein the information of components comprises information of certificate authority (CA) component, information of MySQL component, information of Orderer component, and information of Peer component.

3. The method according to claim 1, wherein the creating the Hyperledger Fabric network in the Kubernetes cluster according to the information of the components and the preset creation order of the components in the preset state machine includes:

acquiring meta information from the information of the components, and initializing the meta information;

creating a component relevant file according to the initialized meta information;

creating a My SQL component according to information of the My SQL component in the information of the components, after the component relevant file is successfully created;

creating a CA component according to information of the CA component in the information of the components, after the MySQL component is successfully created;

creating a certificate file according to the information of the components, after the CA component is successfully created;

creating an Orderer component according to information of the Orderer component in the information of the components, after the certificate file is successfully created;

creating a Peer component according to information of the Peer component in the information of the components, after the Orderer component is successfully created; and determining the Hyperledger Fabric network being successfully created in the Kubernetes cluster and the Hyperledger Fabric network being in a running state, after the Peer component is successfully created.

4. The method according to claim 1, wherein after the creating the Hyperledger Fabric network in the Kubernetes cluster, the method further comprises:

monitoring running states of the components in the Hyperledger Fabric network; and in response detecting that a component stopping running is presented in the Hyperledger Fabric network, recreating the component stopping running according to component information corresponding to the component stopping running in the information of the components.

5. The method according to claim 1, further comprising:

in response to acquiring an upgraded configuration file, recreating, by the fabric operator, the Hyperledger Fabric network in the Kubernetes cluster according to the upgraded configuration file and the preset state machine.

6. A controller for automatically creating a Hyperledger Fabric network in a Kubernetes cluster, applied to a fabric operator, the controller being deployed in the Kubernetes cluster to monitor and manage the Hyperledger Fabric network, the controller comprising:

at least one processor; and a memory storing a set of instructions, the set of instructions when executed by the at least one processor, cause the at least one processor to perform operations, the operations comprise:

acquiring, by the processor, a configuration file required to create a Hyperledger Fabric network in the Kubernetes cluster, wherein the configuration file comprising information of components; and creating, by the processor, the Hyperledger Fabric network in the Kubernetes cluster according to the configuration file and a preset state machine, the preset state machine comprising a preset creation order of the components, wherein creating the Hyperledger Fabric network in the Kubernetes cluster comprises:

creating by the fabric operator, the Hyperledger Fabric network in the Kubernetes cluster according to the information of the components and the preset creation order of the components in the preset state machine.

7. The controller according to claim 6, wherein the information of components comprises information of certificate authority (CA) component, information of MySQL component, information of Orderer component, and information of Peer component.

8. The controller according to claim 6, wherein the creating the Hyperledger Fabric network in the Kubernetes cluster according to the information of the components and the preset creation order of the components in the preset state machine includes:

acquiring meta information from the information of the components, and initializing the meta information;

creating a component relevant file according to the initialized meta information;

creating a My SQL component according to information of the My SQL component in the information of the components, after the component relevant file is successfully created;

creating a CA component according to information of the CA component in the information of the components, after the MySQL component is successfully created;

creating a certificate file according to the information of the components, after the CA component is successfully created;

creating an Orderer component according to information of the Orderer component in the information of the components, after the certificate file is successfully created;

creating a Peer component according to information of the Peer component in the information of the components, after the Orderer component is successfully created; and determining the Hyperledger Fabric network being successfully created in the Kubernetes cluster and the Hyperledger Fabric network being in a running state, after the Peer component is successfully created.

9. The controller according to claim 6, wherein after the creating the Hyperledger Fabric network in the Kubernetes cluster, the operations further comprise:

monitoring running states of the components in the Hyperledger Fabric network; and in response detecting that a component stopping running is presented in the Hyperledger Fabric network, recreating the component stopping running according to component information corresponding to the component stopping running in the information of the components.

10. The controller according to claim 6, wherein the operations further comprise:

in response to acquiring an upgraded configuration file, recreating, by the fabric operator, the Hyperledger Fabric network in the Kubernetes cluster according to the upgraded configuration file and the preset state machine.

11. A non-transitory storage medium, storing an instruction, wherein the instruction, when executed on a computer, causes the computer to perform operations:

acquiring, by a fabric operator, a configuration file required to create a Hyperledger Fabric network in a Kubernetes cluster, wherein the fabric operator is a controller deployed in the Kubernetes cluster to monitor and manage the Hyperledger Fabric network, wherein the configuration file comprising information of components; and automatically creating, by the fabric operator, the Hyperledger Fabric network in the Kubernetes cluster according to the configuration file and a preset state machine, the preset state machine comprising a preset creation order of the components, wherein creating the Hyperledger Fabric network in the Kubernetes cluster comprises:

creating, by the fabric operator, the Hyperledger Fabric network in the Kubernetes cluster according to the information of the components and the preset creation order of the components in the preset state machine.

12. The non-transitory storage medium according to claim 11, wherein the information of components comprises information of certificate authority (CA) component, information of MySQL component, information of Orderer component, and information of Peer component.

13. The non-transitory storage medium according to claim 11, wherein the creating the Hyperledger Fabric network in the Kubernetes cluster according to the information of the components and the preset creation order of the components in the preset state machine includes:

acquiring meta information from the information of the components, and initializing the meta information;

creating a component relevant file according to the initialized meta information;

creating a My SQL component according to information of the My SQL component in the information of the components, after the component relevant file is successfully created;

creating a CA component according to information of the CA component in the information of the components, after the MySQL component is successfully created;

creating a certificate file according to the information of the components, after the CA component is successfully created;

creating an Orderer component according to information of the Orderer component in the information of the components, after the certificate file is successfully created;

creating a Peer component according to information of the Peer component in the information of the components, after the Orderer component is successfully created; and determining the Hyperledger Fabric network being successfully created in the Kubernetes cluster and the Hyperledger Fabric network being in a running state, after the Peer component is successfully created.

14. The non-transitory storage medium according to claim 11, wherein after the creating the Hyperledger Fabric network in the Kubernetes cluster, the operations further comprise:

monitoring running states of the components in the Hyperledger Fabric network; and in response detecting that a component stopping running is presented in the Hyperledger Fabric network, recreating the component stopping running, according to component information corresponding to the component stopping running in the information of the components.

15. The non-transitory storage medium according to claim 11, wherein the operations further include:

in response to acquiring an upgraded configuration file, recreating, by the fabric operator, the Hyperledger Fabric network in the Kubernetes cluster according to the upgraded configuration file and the preset state machine.

* * * * *

UNITED STATES PATENT AND TRADEMARK OFFICE
CERTIFICATE OF CORRECTION

PATENT NO. : 11,307,849 B2
APPLICATION NO. : 16/691353
DATED : April 19, 2022
INVENTOR(S) : Hang Zhou et al.

It is certified that error appears in the above-identified patent and that said Letters Patent is hereby corrected as shown below:

In the Claims

In Column 9, Line 46, in Claim 4, delete "in response detecting that" and insert -- in response to detecting that --.

In Column 10, Line 58, in Claim 9, delete "in response detecting that" and insert -- in response to detecting that --.

In Column 12, Line 28 (Approx.), in Claim 14, delete "in response detecting that" and insert -- in response to detecting that --.

Signed and Sealed this
Ninth Day of August, 2022

Katherine Kelly Vidal
Director of the United States Patent and Trademark Office